Patented Oct. 29, 1929

1,733,524

UNITED STATES PATENT OFFICE

DONALD B. BRADNER, OF HAMILTON, OHIO, ASSIGNOR TO THE CHAMPION COATED PAPER COMPANY, OF HAMILTON, OHIO, A CORPORATION OF OHIO

COATING PAPER

No Drawing.   Application filed November 8, 1926.   Serial No. 147,200.

This invention relates to a process for coating paper and has for its object an improved method of using starch as a binding agent in coatings.

Paper commonly is coated with a mixture of pigment (china clay, satin white or the like) and a water solution of an adhesive or binding agent such as casein, gelatine or so called "treated starch." The mixture is applied to the paper as a fairly thin liquid or slurry and the coated paper is then dried and calendered. So called "treated starch" is starch which has been subjected to chemical treatment and the viscosity of a solution of which is less than the viscosity of a solution of untreated starch of the same concentration. In using treated starch as a binding agent in coatings it has been customary to prepare a solution of the starch by cooking it in water. Attempts to use common untreated starch as the binding agent heretofore have not been successful, since solutions of untreated starch give coating mixtures of such low solid content that they are not suitable, or on the other hand of such high viscosity that they cannot be handled successfully by coating machines. However, treated starch coating mixtures are inferior to casein coating mixtures with respect to solid content and viscosity. It is sometimes desirable in coating paper to apply the maximum of solid matter but the coating mixture must not be so viscous as to interfere with the proper functioning of the coating machine. Besides the coatings should be strongly adherent and relatively insoluble in water. Treated starch coatings have the disadvantage that they are relatively very soluble in water.

Treated starch, casein and gelatine, which are commonly used for coating paper, are relatively expensive as compared with ordinary untreated starch and it is therefore an object of my invention to devise a way to use untreated starch as the binder for paper coatings, i. e., to overcome the difficulty incident to the high viscosity of starch solutions and coating mixtures having a suitable solid content.

I have found that by applying the starch together with the desired pigment in the form of a slurry with water to the paper and then developing the adhesive properties of the starch upon the paper the desired results may be obtained. As stated above starch has always heretofore been used in coating paper in the form of solutions obtained by cooking the starch, such solutions having adhesive properties but being of relatively low solid content as compared with their viscosity. In accordance with my invention the starch is not dissolved or cooked in forming the coating mixture but the powdered starch is simply slurried with water and applied to the paper and then treated to develop the adhesive properties of the starch, i. e., heated or cooked. By using uncooked starch in the form of a slurry, coating mixtures of higher solid content and lower viscosity than casein coating mixtures can be obtained. Casein coating mixtures and the resulting coatings are highly satisfactory from the standpoint of viscosity, solid content and the quality of the coatings and may serve as a standard for comparison. Moreover, the starch coatings so produced are much less soluble than coatings produced from treated starch.

Untreated starch is applied for coating paper in accordance with my invention by preparing a slurry of the desired viscosity and solid content of starch powder and a pigment in water and applying the mixture to the paper in the usual way, and the starch in the coating is then gelatinized by heating in the presence of water, after which the coated paper is dried and calendered like paper coated with any other material. Any kind of starch may be used, for instance corn starch, potato starch, rice starch or the so-called treated starch. Treated starch, however, is more expensive than untreated starch and the coatings formed therefrom are relatively soluble. Untreated corn starch is quite suitable. Also any suitable pigment may be used for instance, china clay or satin white.

In preparing the coating mixtures it is desirable to add a dispersing agent, the quantity and kind of dispersing agent used depending upon the materials employed and the effects desired. The dispersing agent to be used in any particular case may be determined by judicious selection from the large number of known substances having dispersing properties and by testing. It has been found, for instance, that gum arabic, or treated starch are excellent dispersing agents for coating mixtures.

The quantities of starch, pigment and water used in the coating mixtures may vary within a wide range. The following example is an illustration of a composition suitable for heavy coating:

80 parts by weight of china clay.
20 parts by weight of raw corn starch.
120 parts by weight of water.
½ part by weight of gum arabic.

The gelatinization of the starch may be accomplished in any suitable way; the only requirements, so far as I have found, being that it be heated to gelatinizing temperature in the presence of sufficient water or moisture. If the paper coated with the slurry of starch and pigment is dried at a temperature below that at which gelatinization occurs and is then heated to gelatinizing temperature a satisfactory result is not obtained, but if the wet paper with the starch-pigment coating is heated to the gelatinizing temperature of the starch under non-drying or not too rapid drying conditions, a satisfactory result is obtained. The gelatinizing temperature of starch varies from 50° to 80° C., depending upon the variety of starch used. It is the temperature at which starch reacts with water to form a gelatinous mass. The starch granules swell and become more or less transparent and at the same time the starch takes on adhesive properties. The preferred method is to contact the wet coated paper with direct steam which preferably is not superheated or only slightly superheated. The time required for the gelatinization of the starch in the coating is very short. The minimum time has not been determined but it has been found that exposure to steam at practically atmospheric pressure for a few seconds is sufficient to form a hard sized coating. The steam treatment may be accomplished, for instance, by passing the wet coated paper through a steam chest.

Waxes and similar materials to improve the finish, color, or calendering qualities of the coatings may be mixed with the starch slurry or applied to the coated paper either before or after drying in the well-known manner without departing from my invention. It is also within the scope of my invention to add to the starch slurry dyes, or other coloring or tinting agents such as, for instance, aniline colors or mineral colors. It is also within the scope of my invention to add softening agents such as glycerine or castor oil. Additional coatings of the starch mixture or of other coating material may be applied to the paper in the known manner. Such additional coatings may be applied to the coated paper either before or after drying but after the starch coating has been heated as described to develop its adhesive properties.

The process of my invention may be used for applying coatings to only one side or to both sides of paper and coatings on both sides of the paper may be applied simultaneously.

Although the coating process of the invention is designed for heavy coating paper, it may, of course, be used for producing light coatings. In coating paper on both sides of the sheet the application of 25 pounds of coating material to 500 square sheets 25 by 38 inches weighing 50 pounds is regarded as a moderately heavy coating, 20 pounds of coating material on the same amount of paper is regarded as a light coating and 30 pounds of coating material is regarded as a very heavy coating. My process may serve to produce all such coatings.

In the appended claims the expression "raw starch" is employed to designate either the treated or untreated starch in an uncooked or ungelatinized condition. Treated starch, as previously stated, is the material produced by subjecting raw starch to such a chemical treatment that its solutions are of less viscosity than solutions of raw starch of the same concentration. The chemical treatment may be accomplished in a variety of ways, such as for instance, by treatment with acids. Although the chemical changes involved are not definitely known it is probable that the starch undergoes a depolymerization or de-grading change.

I claim:

1. Process of coating paper in the form of a web or sheet which comprises applying thereto an aqueous slurry containing raw starch and contacting the wet coated paper with steam.

2. Process of coating paper which comprises coating the paper in the form of a web or sheet with an aqueous slurry containing raw starch and a pigment, subjecting the coated paper to sufficient heat without substantial drying to gelatinize the starch, and drying and finishing the coated paper.

3. Process of coating paper in the form of a web or sheet which comprises applying thereto a coating of an aqueous slurry containing raw starch, and heating the coated paper to the gelatinizing temperature of the starch in the presence of sufficient moisture to effect the gelatinization of the starch.

4. Process of coating paper in the form of a web or sheet which comprises applying thereto a coating of an aqueous slurry containing raw starch and a pigment, and heating the coated paper to the gelatinizing temperature of the starch in the presence of sufficient moisture to effect the gelatinization of the starch.

5. Process of coating paper in the form of a web or sheet which comprises applying thereto an aqueous slurry containing raw starch and a pigment and contacting the wet coated paper with steam.

6. Process of coating paper in the form of a web or sheet which comprises applying thereto an aqueous slurry containing raw starch and contacting the wet coated paper with substantially saturated steam.

7. Process of coating paper in the form of a web or sheet which comprises applying thereto an aqueous slurry containing raw starch and a pigment, and contacting the wet coated paper with substantially saturated steam.

In testimony whereof, I affix my signature.

DONALD B. BRADNER.